United States Patent
Chirico et al.

[19]

[11] Patent Number: 6,095,468
[45] Date of Patent: Aug. 1, 2000

[54] SUPPORT ARM FOR A SERVICE COLUMN

[75] Inventors: Robert J. Chirico, Batesville; John D. Vogel, Columbus, both of Ind.

[73] Assignee: Hill-Rom, Inc., Batesville, Ind.

[21] Appl. No.: 09/049,833

[22] Filed: Mar. 27, 1998

[51] Int. Cl.⁷ .................................................. E04G 3/00
[52] U.S. Cl. .................................. 248/282.1; 248/289.11; 248/125.7
[58] Field of Search ............................. 248/282.1, 283.1, 248/288.51, 289.11, 343, 280.11, 278.11, 292.11, 324, 123.11, 125.7, 371, 514, 521; 188/83, 74, 75, 76

[56] References Cited

U.S. PATENT DOCUMENTS

| | | |
|---|---|---|
| 2,560,884 | 7/1951 | Nagourney ..................... 248/282.1 X |
| 4,307,672 | 12/1981 | Shikimi . |
| 4,475,322 | 10/1984 | Russo et al. . |
| 4,487,389 | 12/1984 | Ziegler . |
| 4,687,167 | 8/1987 | Skalka et al. .................. 248/282.1 X |
| 4,742,980 | 5/1988 | Heigl . |
| 4,836,478 | 6/1989 | Sweere .......................... 248/280.11 X |
| 4,993,683 | 2/1991 | Kreuzer . |
| 4,997,155 | 3/1991 | Reuter et al. ................... 248/278.1 |
| 5,026,017 | 6/1991 | Kreuzer . |
| 5,037,267 | 8/1991 | Warner et al. . |
| 5,040,765 | 8/1991 | Schonfelder . |
| 5,108,064 | 4/1992 | Kreuzer . |
| 5,126,928 | 6/1992 | Hughes ........................... 248/278.1 X |
| 5,306,109 | 4/1994 | Kreuzer et al. . |
| 5,375,049 | 12/1994 | Witt . |
| 5,396,673 | 3/1995 | Foster . |
| 5,452,807 | 9/1995 | Foster et al. . |
| 5,455,975 | 10/1995 | Foster . |
| 5,480,212 | 1/1996 | Marconet . |
| 5,490,652 | 2/1996 | Martin . |
| 5,527,125 | 6/1996 | Kreuzer et al. . |
| 5,618,090 | 4/1997 | Montague et al. . |
| 5,655,741 | 8/1997 | Watkins . |

FOREIGN PATENT DOCUMENTS

| | | |
|---|---|---|
| 20 61 662 | 6/1972 | Germany . |
| 31 00 819 A1 | 7/1982 | Germany . |
| 37 01 172 A1 | 7/1988 | Germany . |
| 93 09 467 U | 11/1993 | Germany . |
| 93 10 102 U | 11/1993 | Germany . |
| WO 87/07688 | 12/1987 | WIPO . |
| WO 98/33419 | 8/1998 | WIPO . |

OTHER PUBLICATIONS

"The ondaScope® ceiling suspension stand, Modular design, Flexibilty", Ondal Industrietechnik GmbH brochure, Jul. 11, 1996.

*Primary Examiner*—Leslie A. Braun
*Assistant Examiner*—Kimberly T. Wood
*Attorney, Agent, or Firm*—Barnes & Thornburg

[57] ABSTRACT

An apparatus for supporting a service column from a ceiling includes a mounting assembly adapted to be coupled to the ceiling. The mounting assembly includes a tube configured to extend downwardly with respect to the ceiling. The apparatus also includes an arm assembly including a first arm coupled to the tube and extending therefrom. A portion of the arm assembly is adapted to be coupled to the service column so that the service column is supportable at a location spaced from the mounting assembly. The apparatus further includes a leveling mechanism including a first member located beneath a lower end of the tube and engaging the tube adjacent to the lower end, a second member coupled to the first arm, and an adjuster coupled to the first and second members, the adjuster being movable to move the first member relative to the second member to move the first arm relative to the tube.

40 Claims, 9 Drawing Sheets

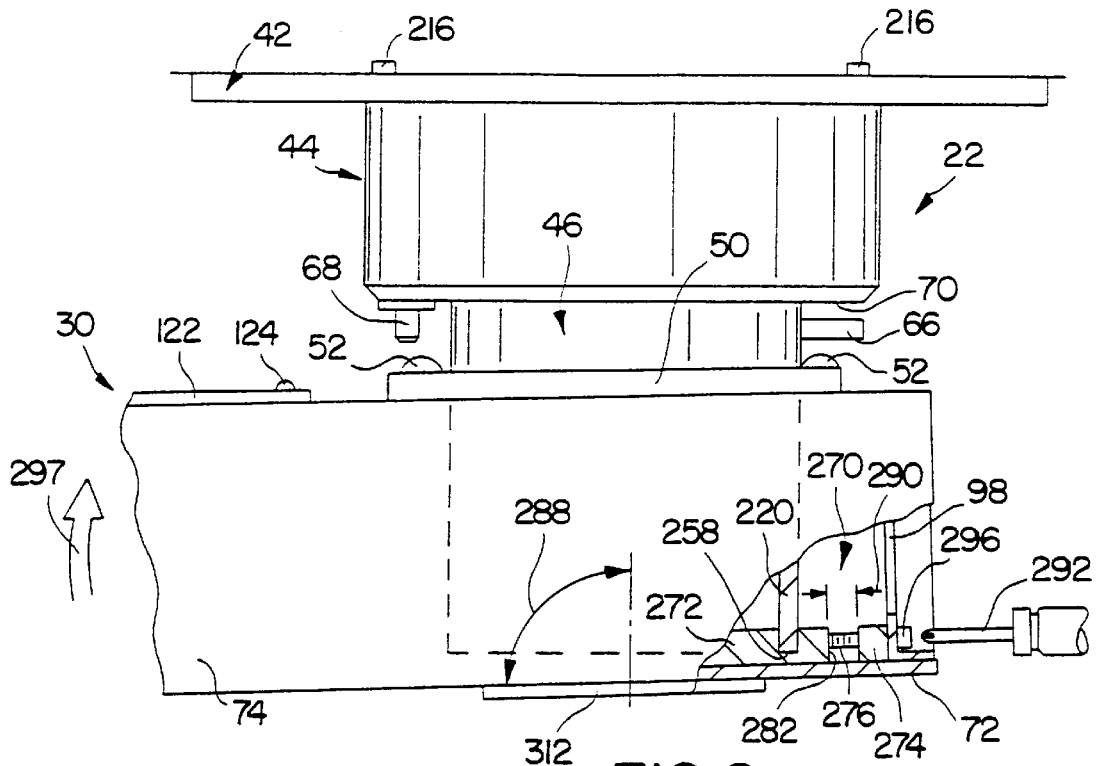
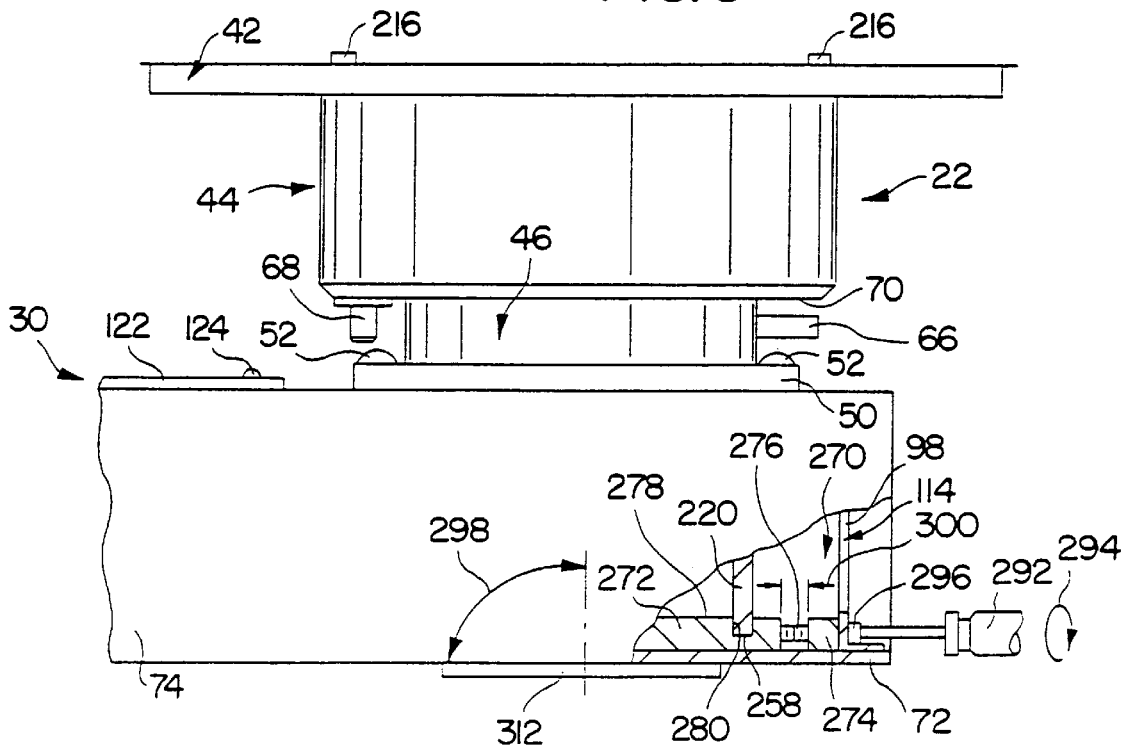

SUPPORT ARM FOR A SERVICE COLUMN

BACKGROUND AND SUMMARY OF THE INVENTION

The present invention relates to a support arm and particularly, to a support arm for a service column. More particularly, the present invention relates to a support arm for a service column having outlets for delivering service, such as electrical power and one or more types of gases, to medical equipment in a hospital room.

Support arms for supporting service columns from a ceiling of a hospital room, such as an operating room or an emergency room, are known. Such arms are often used to support service columns containing one or more electrical lines, gas lines, video lines, data lines, or suction lines. A connector outlet for each of these lines is accessible on the service column allowing various pieces of medical equipment to be coupled thereto to receive the appropriate type of service from the service column. Some service columns include shelves on which objects are placed and rails or tracks to which other pieces of medical equipment are attached. Support arms that swivel relative to the ceiling to allow the service column to be moved into various positions are also known.

According to the present invention, an apparatus for supporting a service column from a ceiling includes a mounting assembly, an arm assembly, and a leveling mechanism. The mounting assembly is adapted to be coupled to the ceiling and includes a tube configured to extend downwardly with respect to the ceiling. The arm assembly includes a first arm coupled to the tube and extending therefrom. A portion of the arm assembly is adapted to be coupled to the service column so that the service column is supportable at a location spaced from the mounting assembly. The first arm is subject to loads having a tendency to deflect the first arm relative to the tube. The leveling mechanism includes a first member engaging the tube, a second member coupled to the first arm, and an adjuster coupled to the first and second members. The adjuster is movable to move the first member relative to the second member thereby to move the first arm relative to the tube to compensate for deflection of the first arm.

In preferred embodiments, the first member includes a plate that is formed with a groove which receives the lower end of the tube and the second member includes a block fixed to the first arm. The plate is formed to include a pair of threaded apertures and the block is formed to include a pair of journal apertures that are aligned with the respective threaded apertures. The adjuster includes a pair of bolts, each of which includes a portion received in a respective journal aperture and a portion received in a respective threaded aperture. Rotation of the bolts moves the block relative to the plate to change the inclination of the first arm relative to the tube.

Also in preferred embodiments, the mounting assembly is configured so that the first arm pivots about a first vertical axis. The arm assembly includes a second arm coupled to the first arm to pivot about a second vertical axis. A second leveling mechanism is provided to adjust the inclination of the second arm relative to the first arm. A first set of brake pads are adjustable to adjust the torque required to pivot the first arm about the first vertical axis and a second set of brake pads are adjustable to adjust the torque required to pivot the second arm about the second vertical axis.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a side elevation view of the support arm apparatus of FIG. 1, with portions broken away, showing the first arm deflected relative to the first tube in an unwanted manner due to the weight of the service column supported by the support arm apparatus and showing an adjustment tool arranged for engagement with one of the leveler bolts of the leveling mechanism;

FIG. 7 is a side elevation view similar to FIG. 6 showing the adjustment tool being rotated to move the first arm to a substantially level orientation;

DETAILED DESCRIPTION OF THE DRAWINGS

Figure 1:
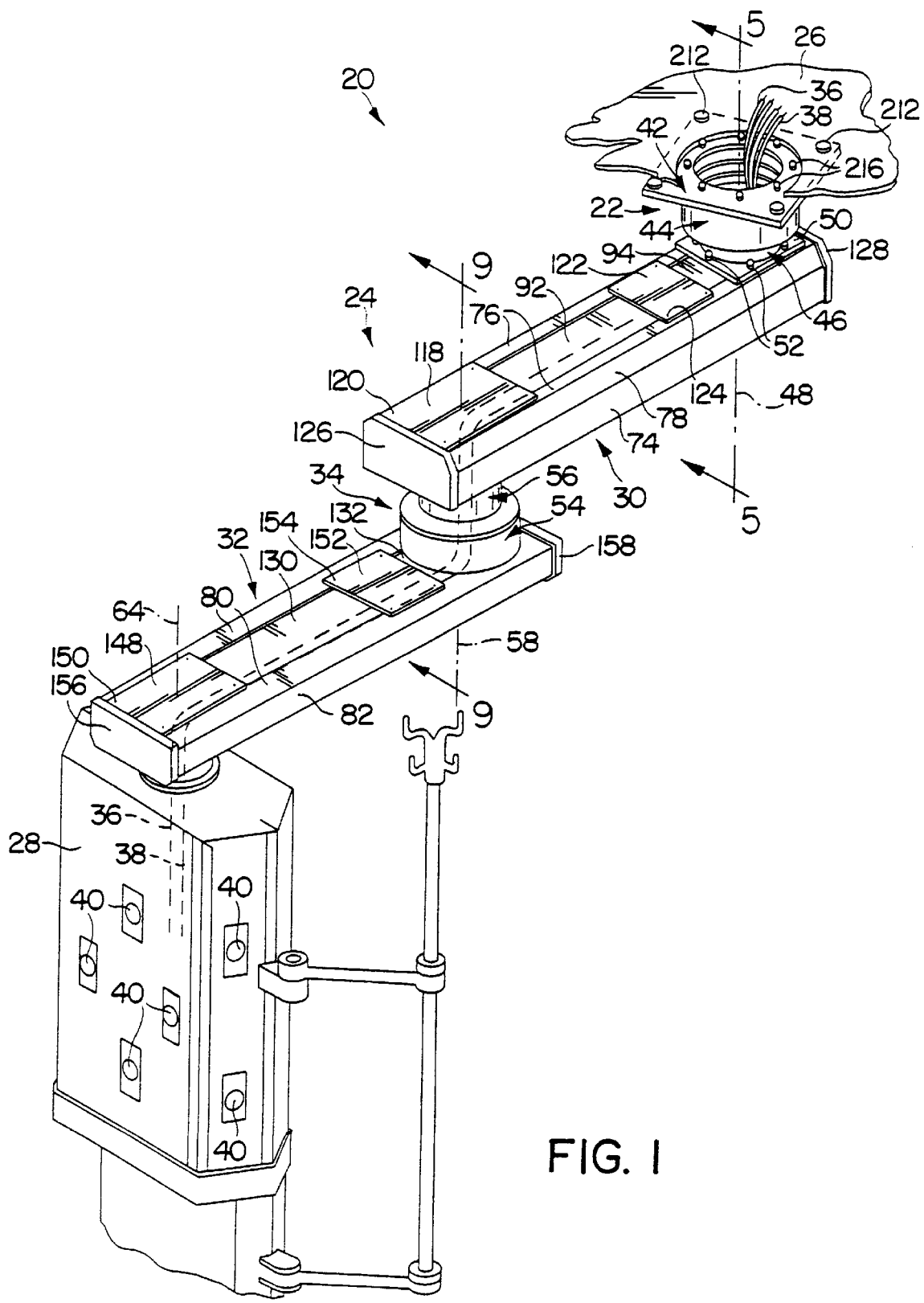
FIG. 1 is an isometric view of a support arm apparatus according to the present invention showing a mounting assembly coupled to a ceiling, a first arm extending from the mounting assembly, a second arm coupled to the first arm by a coupling assembly, a service column coupled to the second arm, and a set of pneumatic and electrical lines routed from the ceiling through internal passages of the support arm into the service column.

A support arm apparatus 20 in accordance with the present invention includes a mounting assembly 22, also known as an upper bearing assembly, and an arm assembly 24 coupled to mounting assembly 22 as shown in FIG. 1. Mounting assembly 22 is configured to mount to a ceiling 26 of a room such as, for example, a hospital operating room or emergency room. Arm assembly 24 is configured to support a service column 28 relative to ceiling 26. Arm assembly 24 includes a first arm 30 coupled to mounting assembly 22, a second arm 32 coupled to service column 28, and a coupling assembly 34, also known as a middle bearing assembly, that couples first and second arms 30, 32 together.

Although support arm apparatus 20 is shown in FIG. 1 as being connected directly to ceiling 26, it is within the scope of the invention as presently perceived for support arm apparatus 20 to be connected to other support structures. For example, mounting assembly 22 may be attached to support structures, such as frames, trusses, weldments, brackets, and plates of all types, that are mounted to ceiling 26 or mounted to beams, joists, or rafters associated with ceiling 26 and that hang downwardly therefrom. In addition, those skilled in the art will appreciate that mounting assembly 22 could be modified so that support arm apparatus 20 is supported relative to a wall, a column, a free-standing frame, or other similar support structure.

Support arm apparatus 20 includes a leveling mechanism 270, shown in FIGS. 4–7, that is operable to adjust the orientation of first arm 30 relative to mounting assembly 22 between a deflected orientation, shown in FIG. 6, and a substantially level orientation, shown in FIG. 7. Support arm apparatus 20 further includes a set of leveler screws 470, shown in FIGS. 8–11, that are adjustable to adjust the orientation of second arm 32 relative to first arm 30 between a deflected orientation, shown in FIG. 10, and a substantially level orientation, shown in FIG. 11. Support arm apparatus 20 includes a set of first brake pads 230 that are adjustable to adjust the torque required to pivot first arm 30 relative to ceiling 26. In addition, support arm apparatus 20 includes a set of second brake pads 430 that are adjustable to adjust the torque required to pivot second arm 32 relative to first arm 30.

Each of mounting assembly 22, first and second arms 30, 32, and coupling assembly 34 have passages therethrough that allow pneumatic lines 36 and electrical lines 38 to be routed downwardly from ceiling 26 through apparatus 20 and into service column 28 as shown in FIG. 1. Pneumatic lines 36 may include lines carrying gases such as oxygen or nitrous oxide, lines carrying high pressure air used to power various equipment and tools, and lines providing suction for removal of fluids. Electrical lines 38 may include lines carrying electrical power, data lines for transmission of data, and audio/video lines. It is within the scope of the invention as presently perceived for other types of pneumatic and electrical lines to be routed from ceiling 26 through apparatus 20 to service column 28. Each of lines 36, 38 terminates at an appropriately configured outlet connector 40 mounted on service column 28.

Illustrative service column 28 is configured to dock with a hospital bed (not shown) or a mobile medical cart (not shown) of the type similar to that described in U.S. patent application Ser. No. 08/792,881, filed on Jan. 31, 1997 and entitled Apparatus and Method for Upgrading a Hospital Room, the specification of which is hereby explicitly incorporated by reference herein. It is within the scope of the invention as presently perceived for support arm apparatus 20 to support any type of service column which is configured for attachment to support arm apparatus 20.

Figure 2:
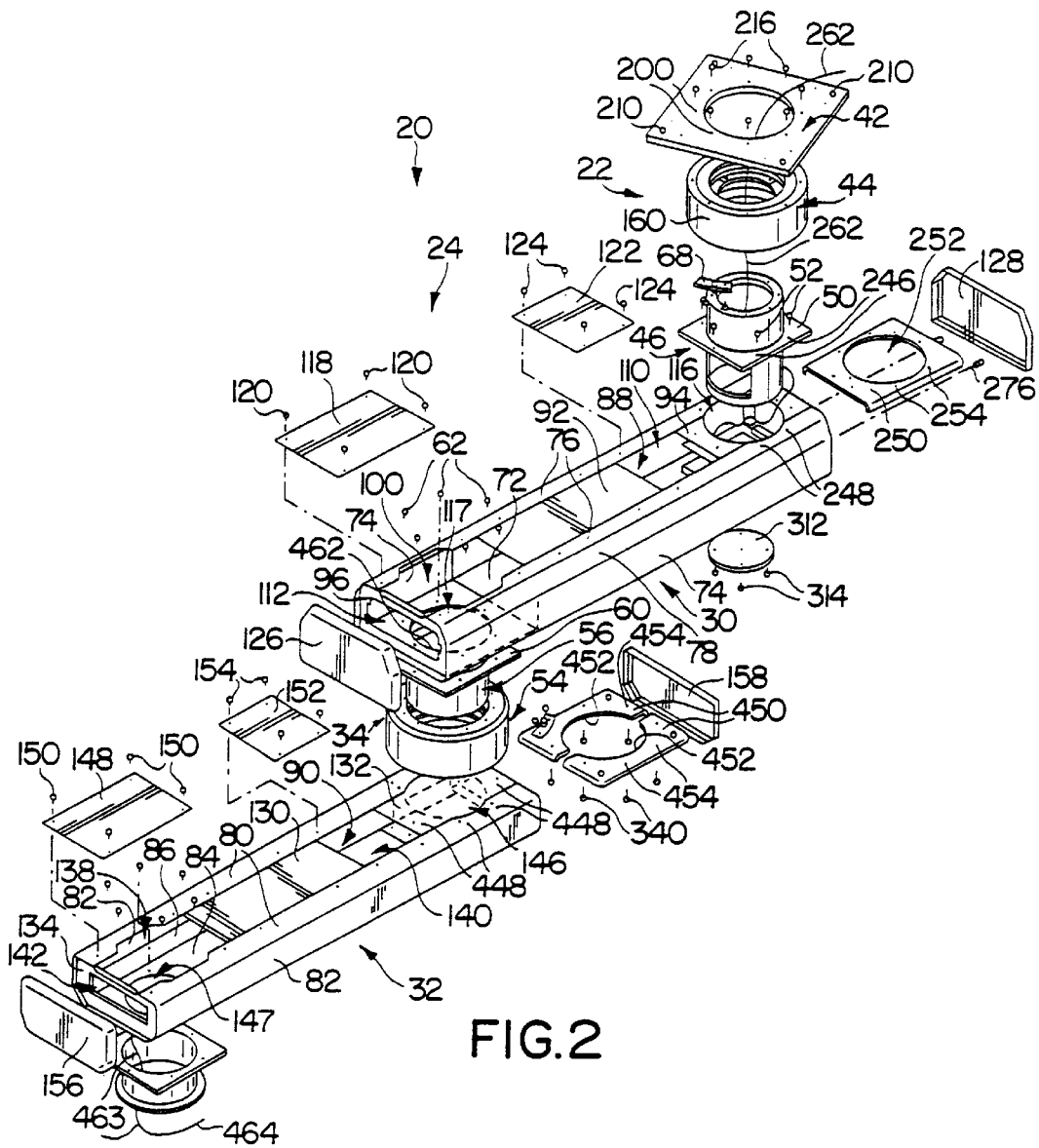
FIG. 2 is an isometric exploded view of the support arm apparatus of FIG. 1 showing a square top plate of the mounting assembly at the top of the page, a first cylindrical housing of the mounting assembly beneath the top plate, a first tube of the mounting assembly beneath the first cylindrical housing, a first square flange appended to the first tube about mid-way between the top and bottom of the first tube, a second cylindrical housing of the coupling assembly positioned between the first and second arms, a second tube of the coupling assembly above the second cylindrical housing, and a second square flange appended to the top of the second tube.

Mounting assembly 22 includes an upper plate 42 configured to couple to ceiling 26, a housing 44 coupled to plate 42, and a tube 46 extending downwardly from housing 44 as shown, for example, in FIG. 1. Tube 46 rotates relative to housing 44 about a first vertical pivot axis 48. A flange 50 is appended to tube 46 and first arm 30 is fastened to flange 50 by suitable fasteners, such as bolts 52, so that first arm 30 pivots about axis 48 along with tube 46. Coupling assembly 34 includes a housing 54 coupled to second arm 32 and a tube 56 extending upwardly from housing 54. A flange 60, shown in FIG. 2, is appended to an upper end of tube 56 and is fastened to first arm 30 by suitable fasteners, such as bolts 62. Housing 54 and second arm 32 are rotatable relative to tube 56 about a second vertical pivot axis 58 shown in FIG. 1. Thus, first and second arms 30, 32 are pivotable about respective axes 48, 58 to adjust the position of service column 28 in the hospital room. In addition, it is within the scope of the invention as presently perceived for service column 28 to be pivotable relative to second arm 32 about a third vertical pivot axis 64 for further adjustment of the position of service column 28.

A first stop arm 66 is appended to tube 46 and extends outwardly therefrom beneath housing 44 and a first stop post member 68 is coupled to an undersurface 70 of housing 44 and extends downwardly therefrom. Stop arm 66 engages stop post member 68 to limit the amount by which first arm 30 is able to pivot about axis 48. Stop arm 66 and stop post member 68 are configured so that first arm 30 is pivotable relative to ceiling 26 through a range of motion that is slightly less than one complete revolution. A second stop arm 67 is appended to tube 56 and extends outwardly therefrom above housing 54 and a second stop post member 69 is coupled to a top surface 71 of housing 54 and extends upwardly therefrom. Stop post member 69 engages stop arm 67 to limit the amount by which second arm 32 is able to pivot about axis 58. Stop arm 67 and stop post member 69 are configured so that second arm 32 is pivotable relative to first arm 30 through a range of motion that is slightly less than one complete revolution.

If service column 28 is pivotable relative to second arm 32 about axis 64, then stop apparatus similar to stop arms 66, 67 and stop members 68, 69 are provided to limit the amount by which service column 28 is able to pivot relative to second arm 32 about axis 64. Limiting the range of pivoting motion of first arm 30, second arm 32, and service column 28 prevents pneumatic and electrical lines 36, 38 from becoming twisted and possibly damaged as would be the case if any of first arm 30, second arm 32, or service column 28 were permitted to pivot through multiple or unlimited revolutions.

In preferred embodiments, first arm 30 is made from a sheet metal blank that is folded into a tubular configuration to provide first arm 30 with a bottom wall 72, a pair of side walls 74 extending upwardly from bottom wall 72, a pair of top wall portions 76 overlying bottom wall 72, and a pair of chamfered wall portions 78 interconnecting side walls 74 and top wall portions 76 as shown in FIG. 2. In addition, second arm 32 is made from a sheet metal blank that is folded into a tubular configuration to provide second arm 32 with a pair of top wall portions 80 a pair of side walls 82 extending downwardly from respective top wall portions 80, a bottom wall 84 underlying top wall portions 80, and a pair of chamfered wall portions 86 interconnecting side walls 82 and bottom wall 84 as also shown in FIG. 2. Thus, first arm 30 includes an interior region 88 bounded by walls 72, 74 and wall portions 76, 78 and second arm 32 includes an interior region 90 bounded by walls 82, 84 and wall portions 80, 86.

First arm 30 includes a fore top plate 92 and an aft top plate 94, each of which are fastened to top wall portions 76 in a suitable manner, such as by welding. First arm 30 further includes a fore bulkhead or end wall 96 and an aft bulkhead or end wall 98, each of which are fastened to one or more of walls 72, 74 and wall portions 76, 78 in a suitable manner, such as by welding. Fore and aft top plates 92, 94 and fore and aft end walls 96, 98 cooperate with walls 72, 74 and wall portions 76, 78 to strengthen first arm 30.

Fore and aft top plates 92, 94 are sized and arranged such that a first top access port or window 100 is defined between plate 92 and end wall 96 and a second top access port or window 110 is defined between plate 92 and plate 94 as shown in FIG. 2. In addition, end wall 96 is formed to include a front end access port or window 112 and end wall 98 is formed to include a rear end access port or window 114. Aft top plate 94 and top wall portions 76 are configured to provide first arm 30 with a tube-receiving aperture 116 adjacent to end wall 98 and bottom wall 72 is formed to include a pass-through aperture 117 adjacent to end wall 96. Pneumatic and electrical lines 36, 38 are routed through each of apertures 116, 117.

First arm 30 includes a first port cover 118 that attaches to top wall portions 76 with suitable fasteners, such as bolts 120, to cover port 100 and a second port cover 122 that attaches to top wall portions 76 with suitable fasteners, such as bolts 124, to cover port 110 as shown in FIGS. 1 and 2. Port covers 118, 122 are each detachable from top wall portions 76 to allow access through ports 100, 110, respectively, to interior region 88 of first arm 30 and the pneumatic and electrical lines 36, 38 contained therein.

A front end cover 126 fastens to first arm 30 adjacent to end wall 96 to cover port 112 and a rear end cover 128 fastens to first arm 30 adjacent to end wall 98 to cover port 114. In preferred embodiments, end covers 126, 128 are configured to snap onto and off of first arm 30. Thus, end covers 126, 128 are each detachable from first arm 30 to allow access through ports 112, 114 to interior region 88 and the pneumatic and electrical lines 36, 38 contained therein. It should be understood that, although port covers 118, 122 and end covers 126, 128 each completely detach from the remainder of first arm 30 to provide access to interior region 88, covers that pivot, slide, or otherwise move between first and second positions to block access and allow access, respectively, to interior region 88 while remaining attached to respective portions of first arm 30 could be provided without exceeding the scope of the present invention.

Second arm 32 includes a fore top plate 130 and an aft top plate 132, each of which are fastened to top wall portions 80 in a suitable manner, such as by welding. Second arm 32 further includes a fore bulkhead or end wall 134 and an aft bulkhead or end wall 136, each of which are fastened to one or more of walls 82, 84 and wall portions 80, 86 in a suitable manner, such as by welding. Fore and aft top plates 130, 132 and fore and aft end walls 134, 136 cooperate with walls 82, 84 and wall portions 80, 86 to strengthen second arm 32.

Fore and aft top plates 130, 132 are sized and arranged such that a third top access port or window 138 is defined between plate 130 and end wall 134 and a fourth top access port or window 140 is defined between plate 130 and plate 132 as shown in FIG. 2. In addition, end wall 134 is formed to include a front end access port or window 142 and end wall 136 is formed to include a rear end access port or window 144. Aft top plate 132 and top wall portions 80 are configured to provide second arm 32 with a pass-through aperture 146 adjacent to end wall 136 and bottom wall 84 is formed to include a pass-through aperture 147 adjacent to end wall 134. Pneumatic and electrical lines 36, 38 are routed through apertures 146, 147.

Second arm 32 includes a third port cover 148 that attaches to top wall portions 80 with suitable fasteners, such as bolts 150, to cover port 138 and a fourth port cover 152 that attaches to top wall portions 80 with suitable fasteners, such as bolts 154, to cover port 140. Port covers 148, 152 are each detachable from top wall portions 80 to allow access through ports 138, 140, respectively, to interior region 90 and the pneumatic and electrical lines 36, 38 contained therein. A front end cover 156 fastens to second arm 32 adjacent to end wall 134 to cover port 142 and a rear end cover 158 fastens to second arm 32 adjacent to end wall 136 to cover port 144. End covers 156, 158 are configured to snap onto and off of second arm 32. Thus, end covers 156, 158 are each detachable from second arm 32 to allow access through ports 142, 144 to interior region 90 and the pneumatic and electrical lines 36, 38 contained therein. Other types of covers, discussed above with reference to first arm 30, may be included in second arm 32 in lieu of port covers 148, 152 and end covers 156, 158 without exceeding the scope of the present invention.

Figure 3:
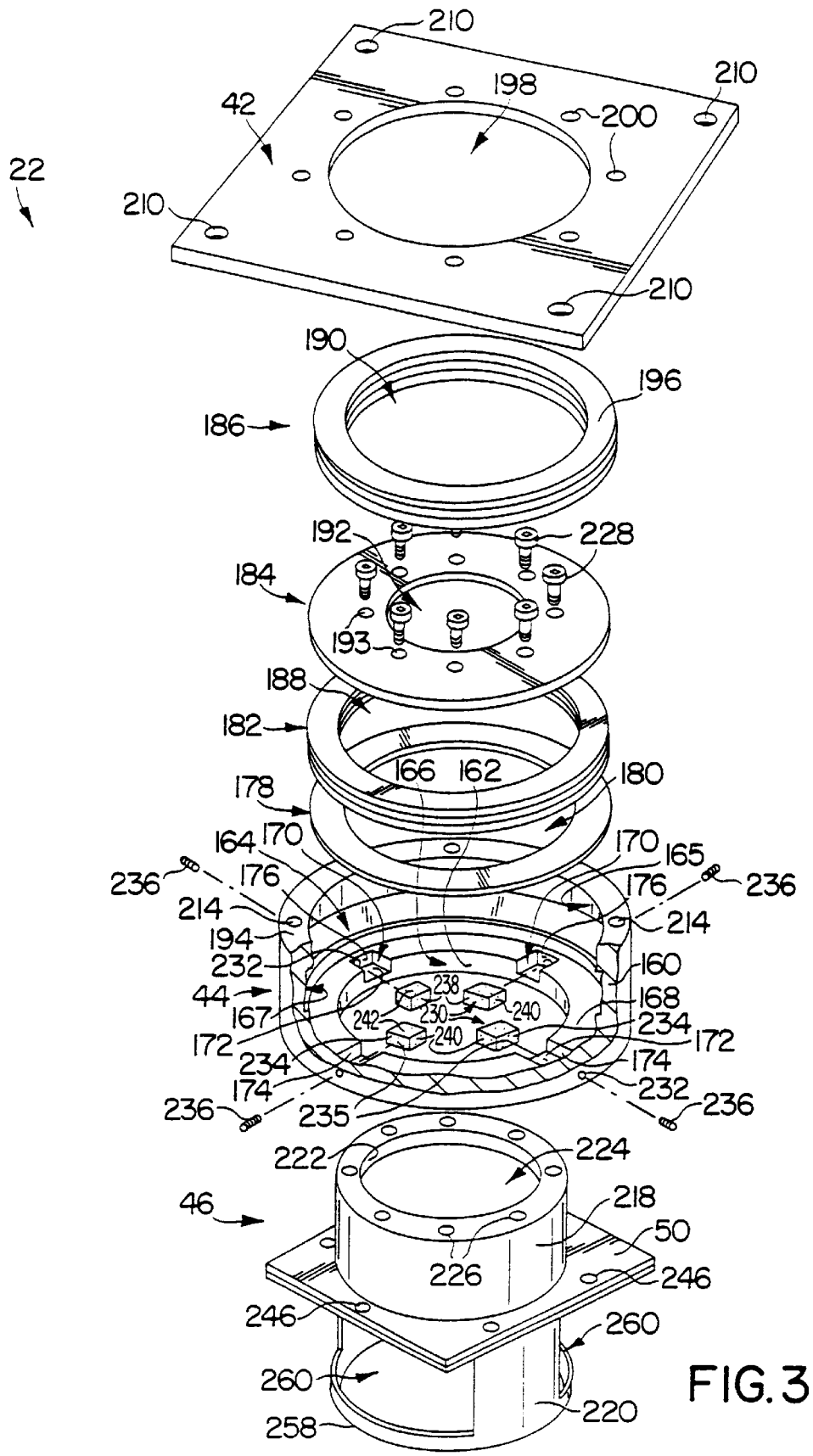
FIG. 3 is an exploded view of the mounting assembly of FIG. 1 showing, from the top of the page to the bottom of the page, the top plate, an upper thrust bearing, a first support plate, a lower thrust bearing, a thin pocket-cover plate, the first cylindrical housing with portions broken away to show a lower annular rim portion, the annular rim portion being formed to include four pockets, a set of first brake pads arranged for insertion into respective pockets, a set of first adjuster screws arranged for insertion into threaded apertures that communicate with respective pockets, and the first tube positioned beneath the first cylindrical housing.

Mounting assembly 22 includes upper plate 42, housing 44, and tube 46 as previously described. Housing 44 includes a cylindrical wall portion 160 and an annular rim portion 162 appended to the bottom of cylindrical wall portion 160 as shown best in FIG. 3. Cylindrical wall portion 160 and annular rim portion 162 define an interior region 164 of housing 44. Cylindrical wall portion 160 is formed to include an upper opening 165 and a circumferential relief groove 167 between upper opening 165 and annular rim portion 162. Annular rim portion 162 is formed to include a tube-receiving opening 166 and an upwardly facing shoulder surface 168. In addition, annular rim portion 162 is formed to include four pockets 170 that are circumferentially spaced about tube-receiving opening 166. Each pocket 170 is bounded by an upwardly facing bottom surface 172, a pair of guide surfaces 174, and a back surface 176 as shown in FIG. 3. Each pocket 170 is open at its top and open at its front to interior region 164.

Mounting assembly 22 includes a pocket-cover plate 178 that is received in interior region 164 and that rests atop shoulder surface 168 to cover pockets 170. Mounting assembly 22 further includes a lower thrust bearing 182 that rests atop pocket-cover plate 178, a support plate 184 that rests atop lower thrust bearing 182, and an upper thrust bearing 186 that rests atop support plate 184. In addition to plate 178, each of upper and lower thrust bearings 182, 186 and support plate 184 are also received in interior region 164. Cylindrical wall porion 160 of housing 44 includes a top surface 194 and upper thrust bearing 186 includes a top surface 196. Cylindrical wall portion 160 of housing 44 is sized so that top surface 194 is substantially coplanar with top surface 196 when plates 178, 184 and bearings 182, 186 are stacked on annular rim portion 162 of housing 44.

Top plate 42 is formed to include a central opening 198 and a plurality of bolt-receiving apertures 200 circumferentially spaced about opening 198 as shown in FIG. 3. In preferred embodiments, top plate 42 is square-shaped and includes corner apertures 210, shown in FIG. 3, that receive bolts 212 to attach support arm apparatus 20 to ceiling 26 as shown in FIG. 1. Cylindrical wall portion 160 of housing 44 includes a plurality of threaded apertures 214 and mounting assembly 22 includes a plurality of bolts 216 that are each received in respective apertures 200 and threaded apertures 214 to attach housing 44 to top plate 42. Mounting assembly 22 is configured so that plates 178, 184 and bearings 182, 186 are trapped between top plate 42 and annular rim portion 162 of housing 44 as shown best in FIG. 5.

Pocket-cover plate 178 is formed to include a tube-receiving opening 180 that has approximately the same diameter as tube-receiving opening 166. Lower thrust bearing 182 includes a bore 188 and upper thrust bearing 186 includes a bore 190. Each of bores 188, 190 have approximately the same diameter as tube-receiving openings 166, 180. Support plate 184 is formed to include a central opening 192 having a diameter that is less than the diameter of bores 188, 190 and tube-receiving openings 166, 188. Support plate 184 is formed to include a plurality of bolt-receiving apertures 193 that are circumferentially spaced about central opening 192 as shown in FIG. 3.

Tube 46 includes an upper cylindrical portion 218 positioned to lie above flange 50 and a lower cylindrical portion 220 positioned to lie below flange 50 as shown, for example, in FIG. 3. An annular rim 222 is appended to the top end of upper cylindrical portion 218. Annular rim 222 is formed to include a central aperture 224 and a plurality of threaded apertures 226 that are circumferentially spaced about central aperture 224. Mounting assembly 22 includes a plurality of bolts 228 that are received in respective bolt-receiving apertures 193 and threaded apertures 226 to couple tube 46 to support plate 184. Tube 46 hangs downwardly from support plate 184 and upper cylindrical portion 218 of tube 46 includes portions that are received in tube-receiving opening 166 of annular rim portion 162, tube-receiving opening 180 of pocket-cover plate 178, and bore 188 of lower thrust bearing 182.

Figure 5:
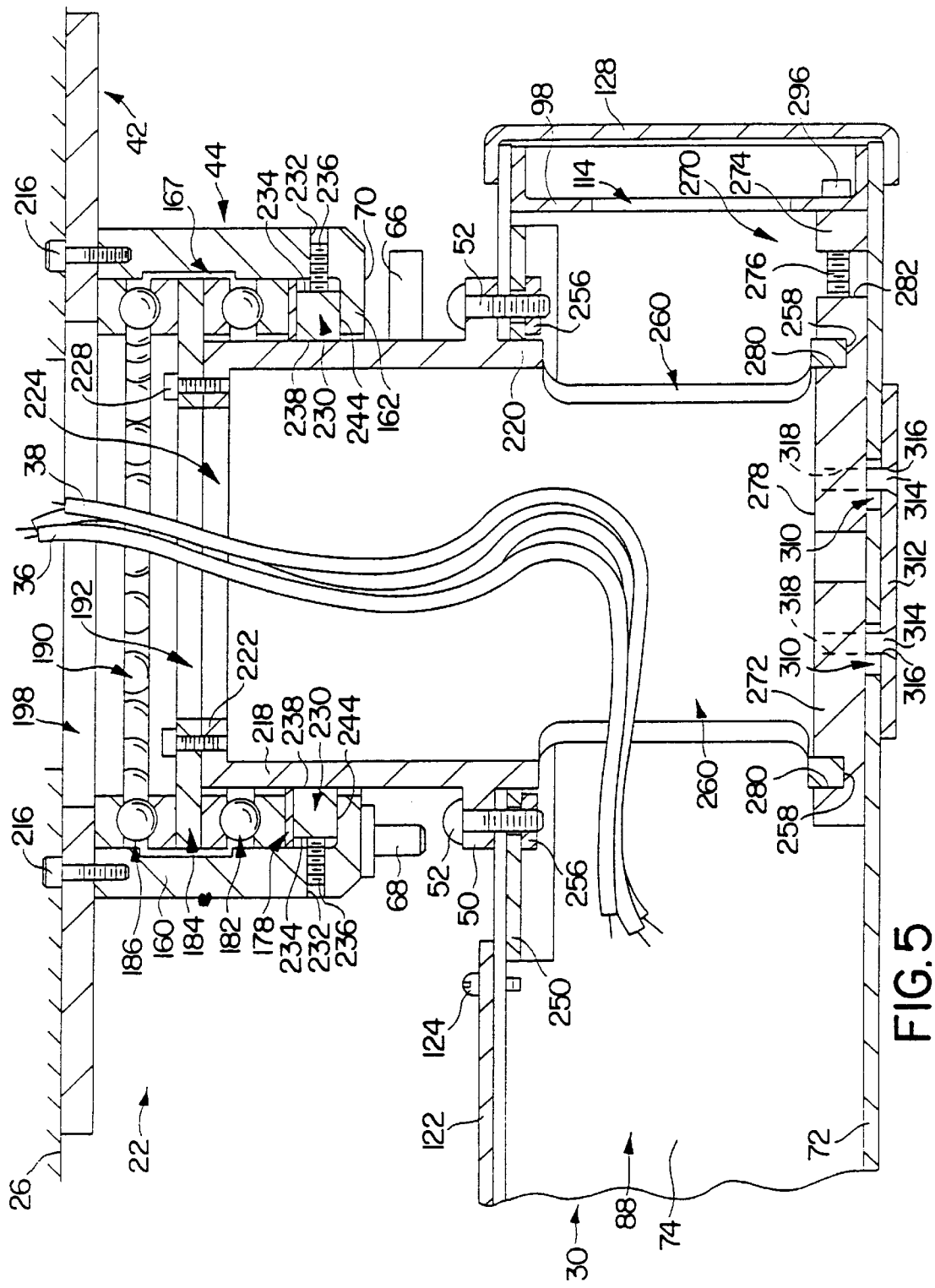
FIG. 5 is a sectional view taken along line 5—5 of FIG. 1 showing the first cylindrical housing coupled to the top plate, the pair of thrust bearings supported in an interior region of the first cylindrical housing, the first support ring sandwiched between the thrust bearings, the first tube coupled to the first support ring and extending downwardly therefrom, the first arm coupled to the first square flange, the first set of brake pads being pressed against the first tube by the respective adjuster screws, and the leveling mechanism coupled to the bottom of the first tube and coupled to the first arm.

Flange 50 is appended to tube 46 and is coupled to first arm 30 with bolts 52 so that first arm 30 and tube 46 pivot together about pivot axis 48 relative to housing 44 as previously described. Relief groove 167 is configured so that rotating portions of upper and lower bearings 182, 186 and support plate 184 are able to rotate without interference from side wall 160. Mounting assembly 22 includes a set of brake pads 230, shown best in FIG. 3, that are received in respective pockets 170. Mounting assembly 22 is configured so that plates 178, 184 and bearings 182, 186 overlie at least a portion of each of brake pads 230 as shown in FIG. 5.

Housing 44 is formed to include four radially extending, threaded apertures 232, each of which communicates with a respective pocket 170. Each brake pad 230 includes a back surface 234 formed with an aperture 235 and mounting assembly 22 further includes a set of adjusters or set screws 236 that are received in respective threaded apertures 232. Set screws 236 extend from threaded apertures 232 into apertures 235 formed in respective back surfaces 234 of brake pads 230. Each brake pad 230 includes a front, braking surface 238, a pair of side surfaces 240, a top surface 242, and a bottom surface 244.

Set screws 236 are rotatable within threaded apertures 232 to adjust the pressure with which braking surface 238 of brake pads 230 engage upper cylindrical portion 218 of tube 46. Each brake pad 230 rests atop respective bottom surfaces 172 between guide surfaces 174. When set screws 236 are rotated, bottom surfaces 244 of brake pads 230 slide relative to respective bottom surfaces 172 of annular rim portion 162. In addition, side surfaces 240 of brake pads 230 are guided by guide surfaces 174 of annular rim portion 162 when set screws 236 are rotated. As brake pads 230 are adjusted so that braking surfaces 238 press against upper cylindrical portion 218 of tube 46 with increasing pressure, the torque required to rotate tube 46 and first arm 32 about pivot axis 48 increases, and as brake pads 230 are adjusted so that braking surfaces 238 press against upper cylindrical portion 218 with less pressure, the torque required to rotate tube 46 and first arm 32 about pivot axis 48 decreases. In preferred embodiments, brake pads 230 are made of DELRIN® material.

Figure 4:
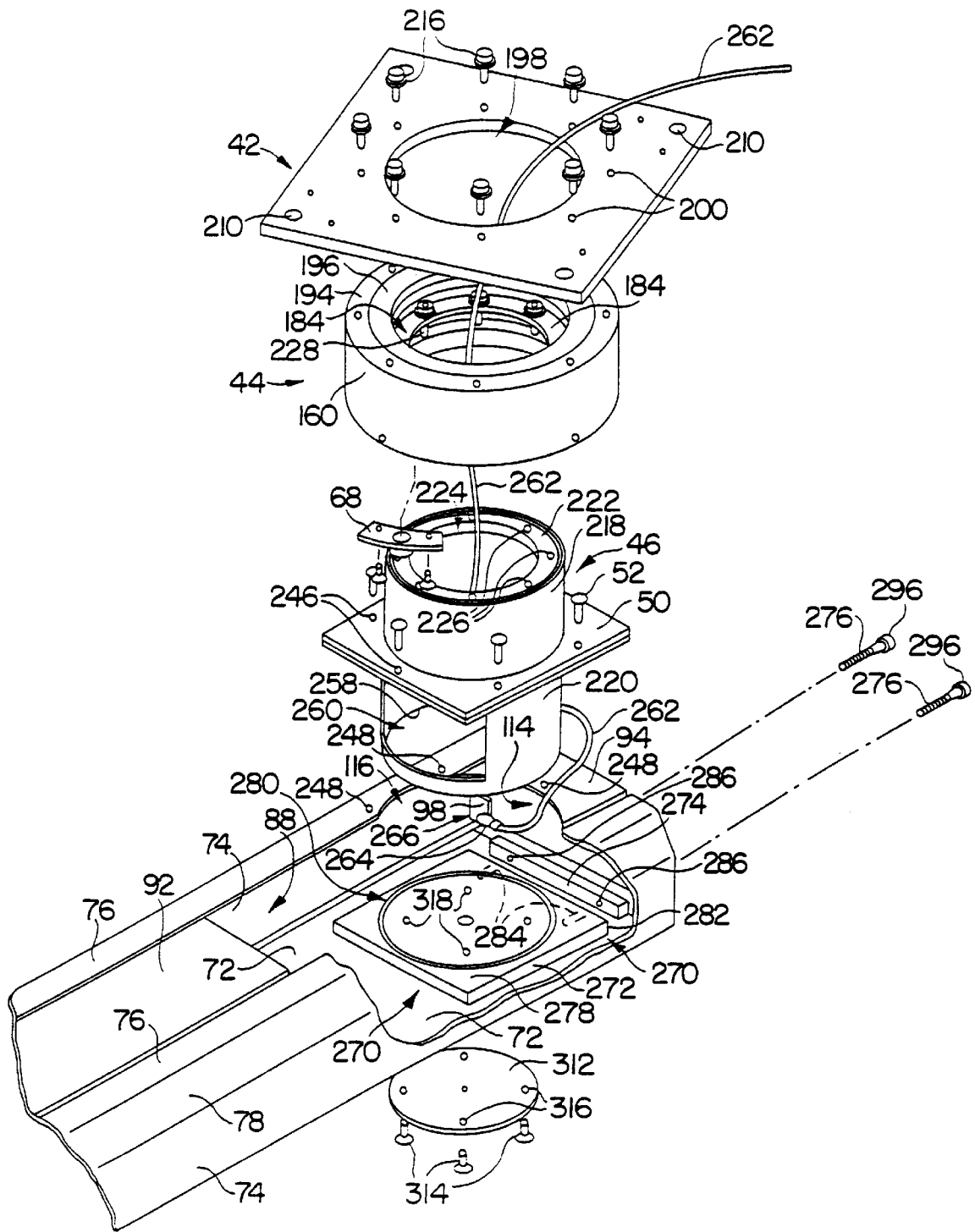
FIG. 4 is an enlarged isometric view of the mounting assembly and a portion of the first arm, with portions broken away, showing a leveling mechanism in an interior region of the first arm, a square leveling plate of the leveling mechanism formed to include a circular groove that receives a lower end of the first tube, a bar of the leveling mechanism spaced from the leveling plate and fixed to the first arm, and a pair of leveler bolts of the leveling mechanism arranged for insertion through respective journal apertures formed in the bar to engage respective threaded apertures formed in the leveling plate.

Flange 50 is formed to include apertures 246 that receive bolts 52 as shown in FIGS. 3 and 4. Aft top plate 94 and top wall portions 76 of first arm 30 are formed to include apertures 248 that are aligned with apertures 246 as shown in FIGS. 2 and 4. First arm 30 further includes a stiffening plate 250 that is received in interior region 88 beneath aft top plate 94. Stiffening plate 250 is formed to include a tube-receiving aperture 252 that is sized to receive lower cylindrical portion 220 of tube 46. Stiffening plate 250 further includes a plurality of apertures 254, shown in FIG. 2, that are circumferentially spaced about aperture 252 and aligned with apertures 246, 248. A plurality of threaded nuts 256, shown in FIG. 5, are welded or otherwise attached to an underside of stiffening plate 250 adjacent to respective apertures 254. Each bolt 52 extends through respective apertures 246, 248, 254 into threaded engagement with respective nuts 256 to attach first arm 30 to tube 46. Flange 50 and stiffening plate 250 reinforce first arm 30 in the region adjacent to tube-receiving aperture 116.

Lower cylindrical portion 220 of tube 46 includes a bottom edge 258 and a pair of pass-through windows 260 positioned to lie between flange 50 and bottom edge 258 as shown best in FIG. 5. Pneumatic and electrical lines 36, 38 are routed through interior region 164 of housing 44, through central aperture 224 formed in annular rim 222 of upper cylindrical portion 218 of tube 46, and through one of windows 260 into interior region 88 of first arm 30 as shown in FIG. 5. In preferred embodiments, a grounding cable 262 is routed through interior region 164 of housing 44, through central aperture 224 formed in annular rim 222 of upper cylindrical portion 218 of tube 46, and through the other of windows 260 into interior region 88 of first arm 30 as shown best in FIG. 4. An end connector 264 at the end of grounding cable 262 is fastened to first arm 30 to ground first arm 30 electrically. Illustratively, end connector 264 is fastened to end wall 98 with a nut and bolt assembly 266.

First arm 30 has a tendency to deflect relative to tube 46 and housing 44 due to loads imparted on first arm 30 by coupling assembly 34, second arm 32, and service column 28. In addition, each of the components comprising mounting assembly 22 have manufacturing tolerances as a result of factors related to the production of each of the components of mounting assembly 22. The manufacturing tolerances of the components of mounting assembly 22 may stack up cumulatively to the extent that tube 46 tilts by a slight amount relative to housing 44 as a result of a moment imparted on tube 46 due to the loading of first arm 30, thereby adding to the deflection of first arm relative to housing 44.

Support arm apparatus 20 includes a leveling mechanism 270, shown in FIGS. 4-7, that is operable to compensate for the deflection of first arm 30 caused by loading of first arm 30 and caused by tolerance stack-up of components associated with first arm 30 and mounting assembly 22. Leveling mechanism 270 includes a first member 272 that engages tube 46, a second member 274 that fastens to first arm 30, and an adjuster 276 that couples to first and second members 272, 274. Adjuster 276 is movable to move second member 274 relative to first member 272 thereby to move first arm 30 relative to tube 46.

First and second members 272, 274 and adjuster 276 are positioned to lie within interior region 88 of first arm 30, although it is within the scope of the invention as presently perceived for any portion or all of leveling mechanism 270 to be positioned to lie outside of interior region 88. In preferred embodiments, first member 272 comprises a leveling plate, hereinafter referred to as leveling plate 272, second member 274 comprises a bar or block 274, hereinafter referred to as bar 274, and adjuster 276 comprises a pair of leveler bolts, hereinafter referred to as leveler bolts 276. It is within the scope of the invention as presently perceived for elements other than leveling plate 272, bar 274, and leveler bolts 276 to be arranged and operated in a suitable manner to adjust the position of first arm 30 relative to tube 46 in accordance with the present invention.

Leveling plate 272 includes a top surface 278 that is formed to include a circular groove 280. In addition, leveling plate 272 includes a rear surface 282 that is formed to include a pair of threaded apertures 284 as shown in FIG. 4 (in phantom). Leveling plate 272 rests atop bottom wall 72 of first arm 30 beneath tube 46 and bottom edge 258 of lower cylindrical portion 220 of tube 46 is received in groove 280 as shown in FIG. 5. Bar 274 is attached in a suitable manner, such as by welding, either to end wall 98, bottom wall 72 of first arm 30, or both. Bar 274 and end wall 98 are formed to include a pair of journal apertures 286 that are aligned with threaded apertures 284 as shown in FIG. 4. Leveler bolts 276 extend through journal apertures 286 and are received in threaded apertures 284 in threaded engagement with leveling plate 272. In preferred embodiments, apertures 284, 286 are arranged such that leveler bolts 276 extend substantially horizontally.

Prior to adjustment of leveling mechanism 270, first arm 30 deflects relative to housing 44 at an angle 288 defined between axis 48 and bottom wall 72 of first arm 30 such that front end wall 96 of first arm 30 moves downwardly by a slight amount and rear end wall 98 of first arm 30 moves upwardly by a slight amount. Thus, first arm 30 deflects so that angle 288 is greater than a right angle as shown in FIG. 6. In addition, prior to adjustment of leveling mechanism 270, bar 274 is spaced apart from leveling plate 272 by a distance 290 as also shown in FIG. 6.

After rear end cover 128 is removed from first arm 30 to allow access to leveling mechanism 270, an adjustment tool 292, such as a screw driver, is inserted into respective tool-receiving voids (not shown) formed in leveler bolts 276. The tool-receiving voids formed in leveler bolts 276 may be configured to mate with flat-head screwdrivers, hex-head screwdrivers, hex wrenches, Philips-head screwdrivers, or any one of a number of other types of adjustment tools. Rotation of adjustment tool 292 in a bolt-advancing direction, indicated by arrow 294 in FIG. 7, causes a head 296 of the respective bolt 276 to engage end wall 98 of first arm 30 to move bar 274 toward leveling plate 272 thereby to create a moment on first arm 30 that counteracts the moment imparted on first arm 30 by second arm 32, coupling assembly 34, and service column 28. As bar 274 moves toward leveling plate 272, first arm 30 moves in a direction represented by double arrow 297, shown in FIG. 6, so that angle 288 decreases. When first arm 30 reaches a "level" or desired orientation, first arm 30 forms approximately a right angle 298 with pivot axis 48. In addition, bar 274 is spaced apart from leveling plate 272 by a distance 300 that is smaller than distance 290 when first arm 30 is in the level orientation as shown in FIG. 7.

First arm 30 includes a plurality of slots 310, shown in FIG. 5, that are formed in bottom wall 72 and support arm apparatus 20 includes a circular support plate 312 that attaches to leveling plate 272 with suitable fasteners, such as bolts 314. Each bolt 314 extends through a respective aperture 316 formed in support plate 312, through a respective slot 310 formed in bottom wall 72 of first arm 30, and into a respective threaded aperture 318 formed in leveling plate 272. Circular support plate 312 is attached to leveling plate 272 after leveling mechanism 270 is operated to adjust first arm 30 relative to tube 46 and relative to housing 44 into the desired orientation. After attachment of support plate 312 to leveling plate 272 with bolts 314, a portion of bottom wall 72 of first arm 30 is clamped between support plate 312 and leveling plate 272 to further support first arm 30 in the desired orientation. Slots 310 are sized and oriented so that support plate 312 is attachable to leveling plate 272 when first arm 30 is in any position within a range of positions.

Figure 8:
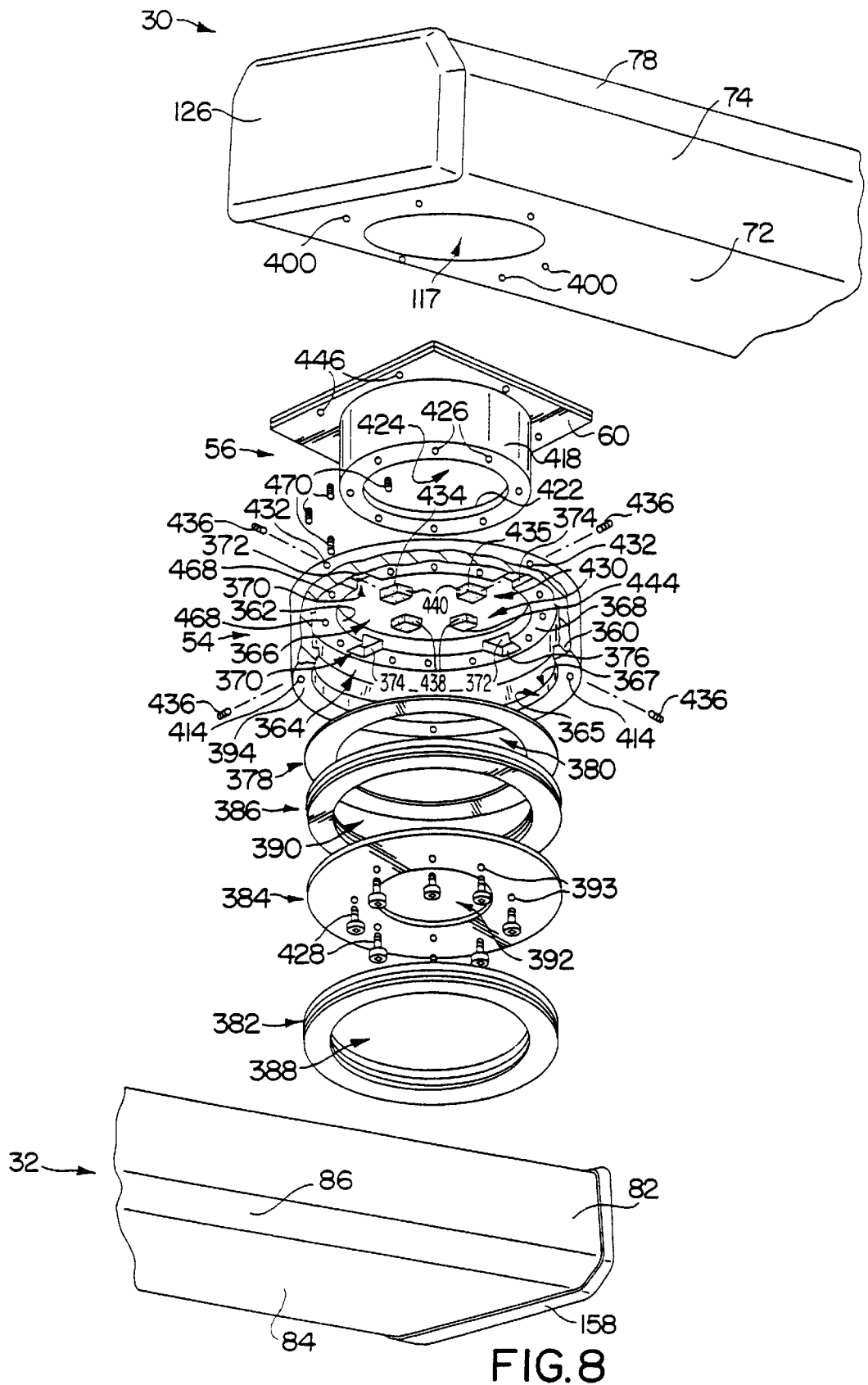
FIG. 8 is an exploded view of the coupling assembly of FIG. 1 between the first and second arms showing the second tube, the second cylindrical housing beneath the second tube with portions broken away to show an upper annular rim portion, the upper annular rim portion being formed to include four pockets, a set of second brake pads arranged for insertion into respective pockets, a set of second adjuster screws arranged for insertion into threaded apertures that communicate with respective pockets, a thin pocket-cover plate beneath the annular rim portion of the second cylindrical housing, an upper thrust bearing beneath the pocket-cover plate, a second support plate beneath the upper thrust bearing, and a lower thrust bearing beneath the second support plate.

Coupling assembly 34 allows second arm 32 to pivot about axis 58 relative to first arm 30 and includes housing 54 coupled to second arm 32 and tube 56 coupled to first arm 30 as previously described. Many of the components of coupling assembly 34 are similar to corresponding components of mounting assembly 22. Housing 54 is similar to housing 44 and includes a cylindrical wall portion 360 and an annular rim portion 362 appended to the top of cylindrical wall portion 360 as shown best in FIG. 8. Cylindrical wall portion 360 and annular rim portion 362 define an interior region 364 of housing 54. Cylindrical wall portion 360 is formed to include a lower opening 365 and a circumferential relief groove 367 between lower opening 365 and annular rim portion 362. Annular rim portion 362 is formed to include a tube-receiving opening 366 and a downwardly facing shoulder surface 368. In addition, annular rim portion 362 is formed to include four pockets 370 that are circumferentially spaced around tube-receiving opening 366. Each pocket 370 is bounded by a downwardly facing top surface 372, a pair of guide surfaces 374, and a back surface 376 as shown in FIG. 8. Each pocket 370 is open at its top and open at its front to interior region 364.

Coupling assembly 34 includes a lower thrust bearing 382 that rests atop top wall portions 80 and aft top plate 132 of second arm 32, a support plate 384 that rests atop lower thrust bearing 382, and an upper thrust bearing 386 that rests atop support plate 384. Coupling assembly 34 further includes a pocket-cover plate 378 that rests atop upper thrust bearing 386 beneath shoulder surface 368. Thus, each of pad-cover plate 378, upper and lower thrust bearings 382, 386, and support plate 384 are received in interior region 364 of housing 54 and are trapped between shoulder surface 368 of annular rim portion 362 and second arm 32. In addition, housing 54 sets atop second arm 32 and is sized so that only a minimal amount of clearance exists between shoulder surface 368 of annular rim portion 362 and pad-cover plate 378.

Bottom wall 72 of first arm is formed to include a plurality of bolt-receiving apertures 400 circumferentially spaced about pass-through aperture 117 as shown in FIG. 8. Flange 60 is formed to include a plurality of threaded apertures 446 that are aligned with bolt-receiving apertures 400. First arm 30 further includes a reinforcement plate 320 that is received in interior region 88 adjacent to pass-through aperture 117 as shown, for example, in FIG. 9. Reinforcement plate 320 is formed to include a plurality of bolt-receiving apertures 322 that are aligned with apertures 400, 446 and a central aperture 324 that is substantially coextensive with aperture 117. Bolts 62 each extend through respective apertures 322, 400 and are received in apertures 446 in threaded engagement with flange 60 as shown in FIG. 9.

Pocket-cover plate 378 is formed to include a tube-receiving opening 380 that has approximately the same diameter as tube-receiving opening 366. Lower thrust bearing 382 includes a bore 388 and upper thrust bearing 386 includes a bore 390. Each of bores 388, 390 have approximately the same diameter as tube-receiving openings 366, 380. Support plate 384 is formed to include a central opening 392 having a diameter that is less than the diameter of bores 388, 390 and tube-receiving openings 366,380. Support plate 384 is formed to include a plurality of bolt-receiving apertures 393 that are circumferentially spaced about central opening 392 as shown in FIG. 3.

Figure 9:
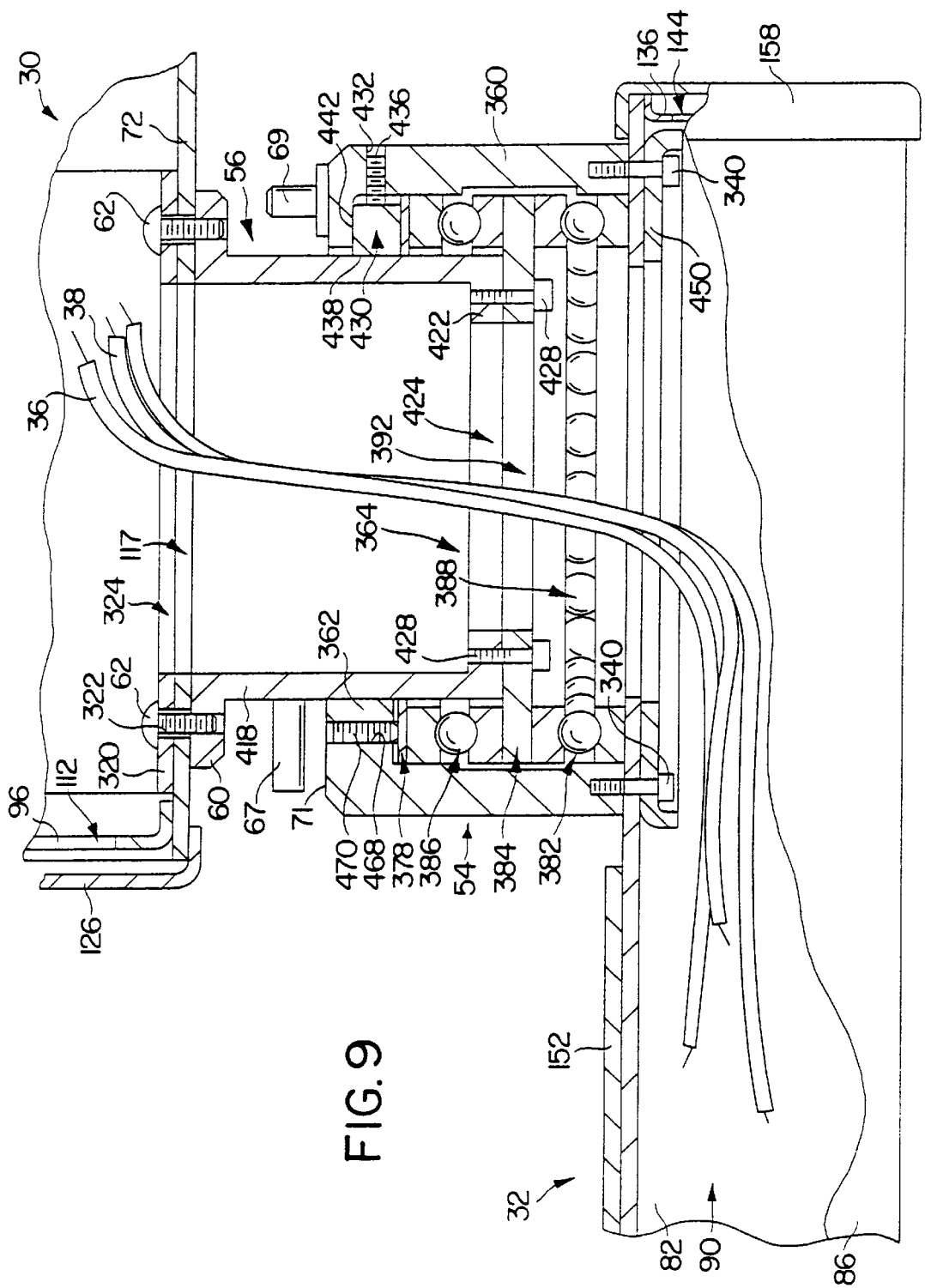
FIG. 9 is a sectional view taken along line 9—9 of FIG. 1 showing the second cylindrical housing coupled to the second arm, the upper and lower thrust bearings supported in an interior region of the of the second cylindrical housing, the second support ring sandwiched between the thrust bearings, the second tube coupled to the second support ring and extending upwardly therefrom, the first arm coupled to the second square flange, one of the second set of brake pads being pressed against the second tube by the respective adjuster screw, one of a set of leveler screws being arranged vertically in a threaded aperture formed in the annular rim portion of the second cylindrical housing, and the bottom of the leveler screw engaging the pocket-cover plate.

Tube 46 includes a cylindrical portion 418 extending downwardly from flange 60 and an annular rim 422 appended to the bottom end of cylindrical portion 418 as shown in FIGS. 8 and 9. Annular rim 422 is formed to include a central aperture 424 and a plurality of threaded apertures 426 that are circumferentially spaced about central aperture 424. Coupling assembly 34 includes a plurality of bolts 428 that are received in respective bolt-receiving apertures 393 of support plate 384 and threaded apertures 426 to couple tube 56 to support plate 384. Tube 56 extends upwardly from support plate 384 such that cylindrical portion 418 of tube 56 includes portions that are received in each of tube-receiving opening 366 of annular rim portion 362, tube-receiving opening 380 of pocket-cover plate 378, and bore 390 of upper thrust bearing 386. Relief groove 367 is configured so that rotating portions of upper and lower bearings 382, 386 and support plate 384 are able to rotate without interference from side wall 360.

Coupling assembly 34 includes a set of brake pads 430, shown best in FIG. 8, that are received in respective pockets 370. Housing 54 is formed to include four radially extending, threaded apertures 432, each of which communicates with a respective pocket 370. Each brake pad 430 includes a back surface 434 formed with an aperture 435 and coupling assembly 34 further includes a set of adjusters or set screws 436 that are received in respective threaded apertures 432. Set screws 436 extend from threaded apertures 432 into apertures 435 formed in respective back surfaces 434 of brake pads 430. Brake pads 430 are substantially similar to brake pads 230 and each brake pad 430 includes a front braking surface 438, a pair of side surfaces 440, a top surface 442, and a bottom surface 444. Plates 378, 384 and bearings 382, 386 underlie at least a portion of each of brake pads 430 as shown in FIG. 9.

Set screws 436 are rotatable within threaded apertures 432 to adjust the pressure with which braking surface 438 of brake pads 430 engage cylindrical portion 418 of tube 56. Each brake pad 430 is positioned to lie beneath top surface 372, between guide surfaces 374, and atop pocket-cover plate 378. When set screws 436 are rotated, bottom surfaces 444 of brake pads 430 slide relative to pocket-cover plate 378. In addition, side surfaces 440 of brake pads 430 are guided by guide surfaces 374 of annular rim portion 362 when set screws 436 are rotated. As brake pads 430 are adjusted so that braking surfaces 438 press against cylindrical portion 418 of tube 56 with increasing pressure, the torque required to rotate tube 56 and second arm 32 about pivot axis 58 increases, and as brake pads 430 are adjusted so that braking surfaces 438 press against cylindrical portion 418 with less pressure, the torque required to rotate tube 56 and second arm 32 about pivot axis 58 decreases. In preferred embodiments, brake pads 430 are made of DELRIN® material as was the case with brake pads 230.

Cylindrical wall porion 360 of housing 54 includes a bottom surface 394 in which a plurality of threaded apertures 414 are formed as shown in FIG. 8. Aft top plate 132 and top wall portions 80 of second arm 32 are formed to include apertures 448, shown in FIG. 2, that are aligned with threaded apertures 414. Second arm 32 further includes a pair of stiffening plate halves 450 that are received in interior region 90 adjacent to pass-through aperture 146. Stiffening plate halves 450 each include an arcuate edge 452 that is substantially coextensive with a respective portion of pass-through aperture 146. Stiffening plate halves 450 each further include a plurality of apertures 454, shown in FIG. 2, that are "circumferentially" spaced about respective arcuate edges 452 and that are aligned with apertures 414, 448. Support arm apparatus 20 includes a plurality of bolts 340 that extend through respective apertures 448, 454 and are received in respective threaded apertures 414 to attach second arm 32 to housing 54. Housing 54 and stiffening plate halves 450 reinforce second arm 32 in the region adjacent to pass-through aperture 146.

Pneumatic and electrical lines 36, 38 are routed from interior region 88 of first arm 30, through tube 56 and interior region 364 of housing 54, and into interior region 90 of second arm 32 as shown in FIG. 9. In preferred embodiments, a grounding cable 462, shown in FIG. 2, is also routed from interior region 88 of first arm 30, through interior region 364 of housing 54, and into interior region 90 of second arm 32. One end of grounding cable 462 is fastened to fore end wall 96 of first arm 30 in a manner similar to the manner in which end connector 264 is fastened to aft end wall 98 of first arm 30 and another end of grounding cable 462 is fastened to aft end wall 136 of second arm 32 in a manner substantially similar to the manner in which end connector 264 is fastened to aft end wall 98 of first arm 30. Grounding cable 462, first arm 30, and grounding cable 262 electrically couple second arm 30 to ground. In preferred embodiments, a grounding cable 463, shown in FIG. 2, is fastened to fore end wall 134 of second arm 32 and includes an end connector 464 configured for attachment to service column 28 so that service column 28 is electrically coupled to ground through grounding cable 463, second arm 32, grounding cable 462, first arm 30, and grounding cable 262.

Second arm 32 has a tendency to deflect relative to tube 56 due to loads imparted on second arm 32 by service column 28. In addition, each of the components comprising coupling assembly 34 have manufacturing tolerances as a result of factors related to the production of each of the components of coupling assembly 34. The manufacturing tolerances of the components of coupling assembly 34 may stack up cumulatively to the extent that tube 56 tilts by a slight amount relative to housing 54 as a result of a moment imparted on tube 56 due to the loading of second arm 32.

Annular rim portion 362 includes a plurality of axially extending, threaded apertures 468 formed therethrough and support arm apparatus 20 includes four leveler screws 470, shown in FIGS. 8–11, that are received in respective apertures 468. Leveler screws 270 are adjustable to move second arm 32 and housing 54 relative to tube 56 thereby to compensate for the deflection of second arm 32 caused by loading of second arm 32 and caused by the tolerance stack-up of components associated with second arm 32 and coupling assembly 34. Leveler screws 270 extend vertically downwardly from apertures 468 into interior region 364 of housing 54 to engage pocket-cover plate 378 as shown, for example, in FIG. 9. Although annular rim portion 362 includes a plurality of threaded apertures 468, leveler set screws 270 are received in the four apertures 468 that are nearest to fore end wall 134 of second arm 32.

Figure 10:
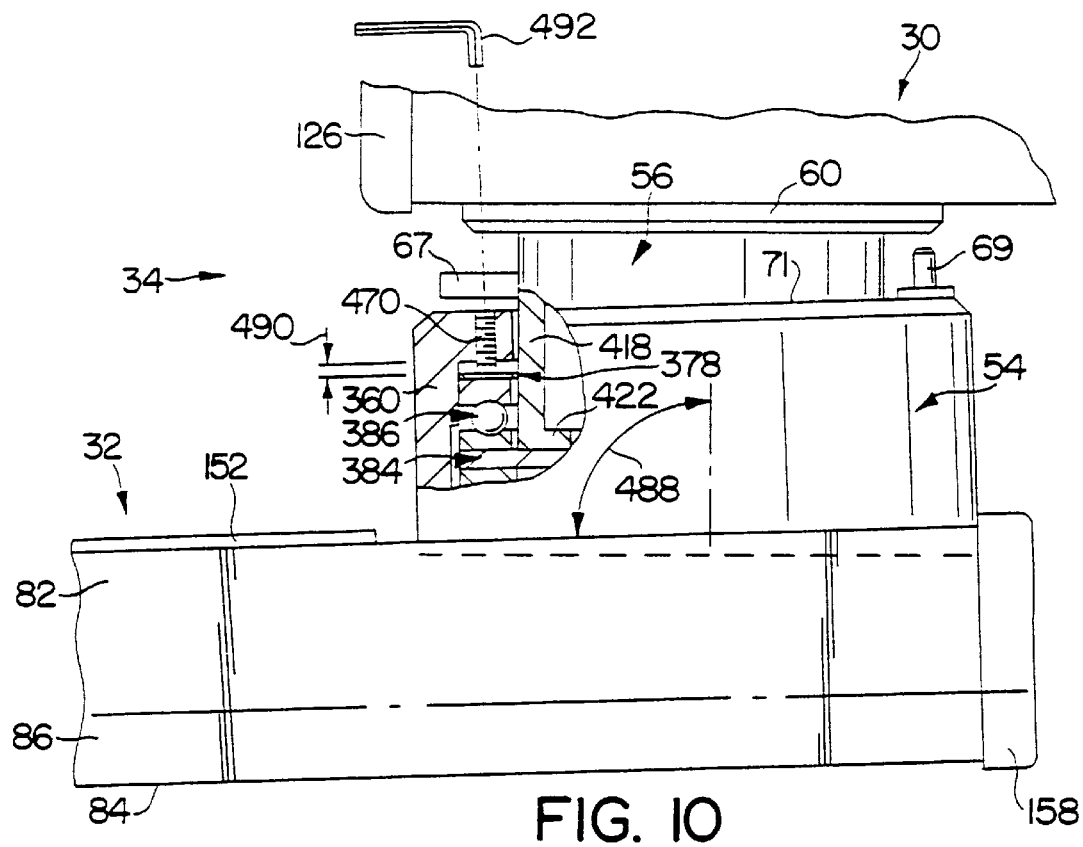
FIG. 10 is a side elevation view of the support arm apparatus of FIG. 9 showing the second arm deflected relative to the first arm in an unwanted manner due to the weight of the service column supported by the support arm apparatus and showing an adjustment tool arranged for engagement with one of the set of leveler screws.

Prior to adjustment of leveler screws 470, second arm 32 deflects relative to tube 56 at an angle 488 defined between pivot axis 58 and top wall portions 80 of second arm 32 such that fore end wall 134 of second arm 32 moves downwardly by a slight amount and aft end wall 136 of second arm 32 moves upwardly by a slight amount. Thus, second arm 32 deflects so that angle 488 is greater than a right angle as shown in FIG. 10. In addition, prior to adjustment of leveler screws 470, the portion of shoulder surface 368 nearest to fore end wall 134 is spaced apart from the underlying portion of pocket-cover plate 378 by a distance 490 as also shown in FIG. 10.

Figure 11:
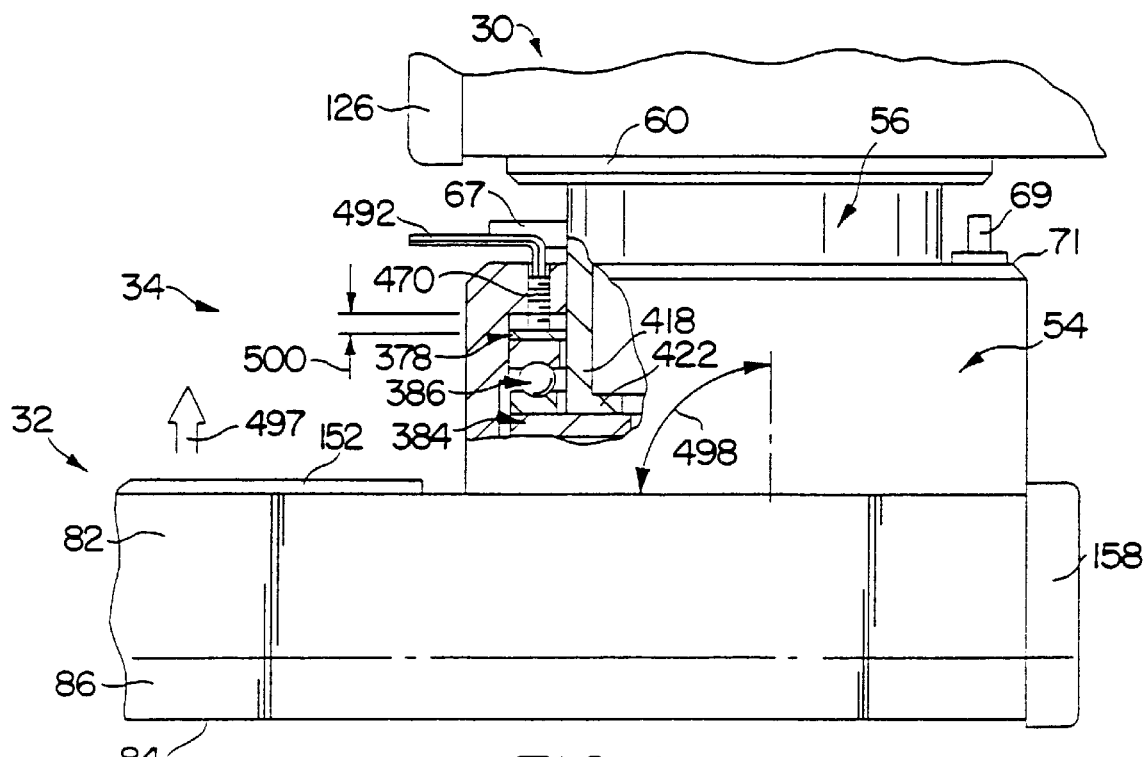
FIG. 11 is a sectional view similar to FIG. 10 showing the second arm extending in a substantially level orientation after adjustment of the set of leveler screws that extend downwardly from the top annular rim of the second cylindrical housing into engagement with the pocket-cover plate.

During adjustment of the orientation of second arm 32 relative to first arm 30, an adjustment tool 492, such as an L-shaped hex wrench, is inserted into tool-receiving voids (not shown) formed in the top end of each respective leveler screw 470. The tool-receiving voids formed in each of leveler screws 470 may be configured to mate with flat-head screwdrivers, hex-head screwdrivers, hex wrenches, Philips-head screwdrivers, or any one of a number of other types of adjustment tools. Rotation of adjustment tool 492 in a screw-advancing direction causes the associated leveler screw 470 to move downwardly and causes housing 54 to move relative to tube 56 in a manner that imparts a moment on second arm 32 which counteracts the moment imparted on second arm 32 by service column 28. As housing 54 moves relative to tube 56 during downward movement of leveler screws 470 due to rotation of adjustment tool 492 in the screw-advancing direction, second arm 32 moves in a direction represented by double arrow 497, shown in FIG. 11, so that angle 488 decreases. When second arm 32 reaches a "level" or desired orientation, second arm 32 forms approximately a right angle 498 with pivot axis 58 and the portion of shoulder surface 368 nearest to fore end wall 134 of second arm 32 is spaced apart from the underlying portion of pocket-cover plate 378 by a distance 500 that is smaller than distance 490 as shown in FIG. 11.

Thus, support arm apparatus 20 includes leveling mechanism 270 that is operable to change the inclination of first arm 30 and leveler screws 470 that are adjustable to change the inclination of second arm 32. As the inclination of first and second arms 30, 32 is adjusted, the vertical distance between service column 28 and ceiling 26 is adjusted. If service column 28 is configured to mate with one or more separate pieces of floor-supported medical equipment (not shown), such as hospital beds or medical carts, leveling mechanism 270 and leveler screws 470 are used to adjust the position of service column 28 to a position that optimizes the mating or docking of the service column 28 with the pieces of medical equipment. In addition, it is desirable to have first and second arms 30, 32 adjusted to level orientations for aesthetic reasons.

Although the invention has been described in detail with reference to a certain preferred embodiment, variations and modifications exist within the scope and spirit of the invention as described and defined in the following claims.

What is claimed is:

1. An apparatus for supporting a service column from a ceiling, the apparatus comprising a mounting assembly adapted to be coupled to the ceiling, the mounting assembly including a tube configured to extend downwardly with respect to the ceiling, the tube having a lower end, an arm assembly including a first arm coupled to the tube and extending therefrom, a portion of the arm assembly being adapted to be coupled to the service column so that the service column is supportable at a location spaced from the mounting assembly, and a leveling mechanism including a first member located beneath the lower end of the tube and engaging the tube adjacent to the lower end, a second member coupled to the first arm, and an adjuster coupled to the first and second members, the adjuster being movable to move the first member relative to the second member to move the first arm relative to the tube.

2. The apparatus of claim 1, wherein the first member comprises a leveling plate formed to include a groove that receives the lower end of the tube.

3. The apparatus of claim 2, wherein the first arm is formed to include an interior region and the leveling plate is positioned to lie in the interior region.

4. The apparatus of claim 2, wherein the leveling plate includes a threaded aperture and the adjuster includes a bolt having a portion received in the threaded aperture.

5. The apparatus of claim 2, further comprising a support plate beneath the first arm and beneath the leveling plate and a fastener coupling the support plate to the leveling plate so that a portion of the first arm is positioned to lie between the support plate and the leveling plate.

6. The apparatus of claim 1, wherein the first arm is formed to include an interior region and the first member is positioned to lie in the interior region.

7. The apparatus of claim 1, wherein the first arm includes a bottom wall and a pair of side walls extending upwardly from the bottom wall, the first member rests upon the bottom wall, and the second member is fastened to the bottom wall.

8. The apparatus of claim 1, wherein the first arm includes a bottom wall and an end wall extending upwardly from the bottom wall, the first member rests on the bottom wall, and the second member is fastened to the end wall.

9. The apparatus of claim 1, wherein the first member is formed to include a threaded aperture, the second member is formed to include a journal aperture aligned with the threaded aperture, and the adjuster includes a bolt having a first portion received in the threaded aperture and a second portion received in the journal aperture.

10. The apparatus of claim 1, wherein the arm assembly includes a second arm and a coupling assembly coupling the second arm to the first arm, the coupling assembly including a leveling device for adjusting the inclination of the second arm relative to the first arm.

11. The apparatus of claim 10, wherein the coupling assembly includes a housing coupled to the second arm and a plate fixed with respect to the first arm, the housing includes a side wall and a rim appended to the side wall, the side wall defines an interior region of the housing, the plate is positioned to lie in the interior region, the leveling device includes a screw that acts between the rim and the plate to adjust the inclination of the second arm relative to the first arm.

12. An apparatus for supporting a service column from a ceiling, the apparatus comprising:

an arm assembly adapted to be coupled to the service column, the arm assembly including a first arm, and a mounting assembly adapted to be coupled to the ceiling, the mounting assembly including a housing having a side wall defining an interior region and a tube supported by the housing for rotation about a pivot axis, at least a portion of the tube being positioned to lie in the interior region, the first arm being coupled to the tube to pivot with the tube about the pivot axis, and the mounting assembly further including at least one brake pad positioned to lie in the interior region of the housing and an adjuster engaging the brake pad, the adjuster being movable to adjust a pressure with which the brake pad engages the tube to adjust a torque required to pivot the first arm, wherein the side wall of the housing includes a cylindrical side wall portion and an annular rim portion extending radially inwardly from the cylindrical side wall portion, the annular rim is formed to include a pocket, and at least a portion of the brake pad is positioned to lie in the pocket.

13. The apparatus of claim 12, wherein the housing is formed to include a threaded aperture extending through the cylindrical side wall portion, the threaded aperture communicates with the pocket, and the adjuster includes a screw received in the threaded aperture and extending therefrom into the pocket to engage the brake pad.

14. The apparatus of claim 12, wherein the annular rim includes an upwardly facing surface defining a bottom of the pocket and the brake pad rests upon the upwardly facing surface.

15. The apparatus of claim 12, wherein the annular rim includes a pair of guide surfaces defining sides of the pocket and the guide surfaces guide the movement of the brake pad within the pocket.

16. The apparatus of claim 12, wherein the mounting assembly includes a bearing in the interior region of the housing and the annular rim supports the bearing such that a portion of the bearing overlies the brake pad.

17. An apparatus for supporting a service column from a support structure, the apparatus comprising a mounting assembly adapted to be coupled to the support structure, the mounting assembly including a tube configured to extend vertically, the tube having a lower end, an arm assembly including a first arm coupled to the tube and extending therefrom, a portion of the arm assembly being adapted to be coupled to the service column so that the service column is supportable at a location spaced from the mounting assembly, and a leveling mechanism including a first member engaging the tube, a second member coupled to the first arm, and an adjuster coupled to the first and second members, the adjuster being movable to move the first member relative to the second member to move the first arm relative to the tube, the first member including a leveling plate formed to include a groove that receives the lower end of the tube.

18. The apparatus of claim 17, wherein the first arm is formed to include an interior region and the leveling mechanism is positioned to lie in the interior region.

19. The apparatus of claim 17, wherein the first arm includes a bottom wall and a pair of side walls extending upwardly from the bottom wall, the first and second members are positioned to lie between the side walls, the first member rests upon the bottom wall, and the second member is fastened to the bottom wall.

20. The apparatus of claim 17, wherein the first arm includes a bottom wall and an end wall extending upwardly from the bottom wall, the first member rests on the bottom wall, and the second member is fastened to the end wall.

21. The apparatus of claim 17, wherein the first member is formed to include a threaded aperture, the second member is formed to include a journal aperture aligned with the threaded aperture, and the adjuster is a bolt having a first portion received in the threaded aperture and a second portion received in the journal aperture.

22. The apparatus of claim 21, wherein the first arm is pivotable about a vertical pivot axis and the threaded aperture and the journal aperture define an axis that is substantially horizontal.

23. The apparatus of claim 17, wherein the mounting assembly is adapted to couple to a ceiling.

24. An apparatus for supporting a service column from a support structure, the apparatus comprising a mounting assembly adapted to be coupled to the support structure, an arm assembly including a first arm coupled to the mounting assembly and extending therefrom, a portion of the arm assembly being adapted to be coupled to the service column so that the service column is supportable at a location spaced from the mounting assembly, and leveling means coupled to the first arm for leveling the first arm relative to the support structure, the leveling means including a first member formed to include a threaded aperture, a second member formed to include a journal aperture aligned with the threaded aperture, and a bolt having a first portion received in the threaded aperture and a second portion received in the journal aperture, the first arm being pivotable about a vertical pivot axis and the threaded aperture and the journal aperture define an axis that is substantially horizontal.

25. The apparatus of claim 24, wherein the mounting assembly includes a tube having a lower end and the first member of the leveling means includes a leveling plate formed to include a groove that receives the lower end of the tube.

26. The apparatus of claim 24, wherein the first arm is formed to include an interior region and the leveling means is positioned to lie in the interior region.

27. The apparatus of claim 24, wherein the first arm includes a bottom wall and a pair of side walls extending upwardly from the bottom wall, herein the first and second member are positioned to lie between the side walls, the first member rests upon the bottom wall, and the second member is fastened to the bottom wall.

28. The apparatus of claim 24, wherein the first arm includes a bottom wall and an end wall extending upwardly from the bottom wall, wherein the the first member rests on the bottom wall, and the second member is fastened to the end wall.

29. The apparatus of claim 24, wherein the mounting assembly is adapted to couple to a ceiling.

30. An apparatus for supporting a service column from a ceiling, the apparatus comprising
   a mounting assembly adapted to be coupled to the ceiling, the mounting assembly including a tube configured to extend downwardly with respect to the ceiling,
   an arm assembly including a first arm coupled to the tube and extending therefrom, a portion of the arm assembly being adapted to be coupled to the service column so that the service column is supportable at a location spaced from the mounting assembly, the first arm being formed to include an interior region, and
   a leveling mechanism including a first member positioned to lie in the interior region of the first arm and to engage the tube, a second member coupled to the first arm, and an adjuster coupled to the first and second members, the adjuster being movable to move the first member relative to the second member to move the first arm relative to the tube.

31. The apparatus of claim 30, wherein the second member is positioned to lie in the interior region.

32. The apparatus of claim 31, wherein the adjuster is positioned to lie in the interior region.

33. The apparatus of claim 31, wherein the adjuster is positioned to lie in the interior region, the first arm includes an access port communicating with the interior region, the adjuster is accessible through the access port, and further comprising a port cover coupled to the first arm to cover the access port and block access to the adjuster, the port cover being movable to a position allowing access to the adjuster through the access port.

34. An apparatus for supporting a service column from a ceiling, the apparatus comprising:
   a mounting assembly adapted to be coupled to the ceiling, the mounting assembly including a tube configured to extend downwardly with respect to the ceiling,
   an arm assembly including a first arm coupled to the tube and extending therefrom, a portion of the arm assembly being adapted to be coupled to the service column so that the service column is supportable at a location spaced from the mounting assembly, the first arm including a bottom wall and a pair of side walls extending upwardly from the bottom wall, and
   a leveling mechanism including a first member resting upon the bottom wall and engaging the tube, a second member fastened to the bottom wall of the first arm, and an adjuster coupled to the first and second members, the adjuster being movable to move the first member relative to the second member to move the first arm relative to the tube.

35. The apparatus of claim 34, wherein the first arm further includes an end wall arranged between the side walls and the second member is also fastened to the end wall.

36. The apparatus of claim 34, wherein the first member is formed to include a threaded aperture, the second member is formed to include a journal aperture aligned with the threaded aperture, and the adjuster includes a bolt having a first portion received in the threaded aperture and a second portion received in the journal aperture.

37. The apparatus of claim 36, wherein the first arm is pivotable about a vertical pivot axis and the threaded aperture and the journal aperture define an axis that is substantially horizontal.

38. An apparatus for supporting a service column from a ceiling, the apparatus comprising:
   a mounting assembly adapted to be coupled to the ceiling, the mounting assembly including a tube configured to extend downwardly with respect to the ceiling,
   an arm assembly including a first arm coupled to the tube and extending therefrom, a portion of the arm assembly being adapted to be coupled to the service column so that the service column is supportable at a location spaced from the mounting assembly, the first arm including a bottom wall and an end wall extending upwardly from the bottom wall, and
   a leveling mechanism including a first member resting on the bottom wall and engaging the tube, a second member fastened to the end wall of the first arm, and an adjuster coupled to the first and second members, the adjuster being movable to move the first member relative to the second member to move the first arm relative to the tube.

39. An apparatus for supporting a service column from a ceiling, the apparatus comprising:
   a mounting assembly adapted to be coupled to the ceiling, the mounting assembly including a tube configured to extend downwardly with respect to the ceiling,
   an arm assembly including a first arm coupled to the tube and extending therefrom, a portion of the arm assembly being adapted to be coupled to the service column so that the service column is supportable at a location spaced from the mounting assembly, a second arm, and a coupling assembly coupling the second arm to the first arm, the coupling assembly including a housing coupled to the second arm and a plate fixed with respect to the first arm, the housing includes a side wall and a rim appended to the side wall, the side wall defining an interior region of the housing, the plate being positioned to lie in the interior region, and a leveling device configured to adjust the inclination of the second arm relative to the first arm, the coupling assembly also including a leveling device including a screw that acts between the rim and the plate to adjust the inclination of the second arm relative to the first arm, and
   a leveling mechanism including a first member engaging the tube, a second member coupled to the first arm, and an adjuster coupled to the first and second members, the adjuster being movable to move the first member relative to the second member to move the first arm relative to the tube.

40. An apparatus for supporting a service column from a support structure, the apparatus comprising:

a mounting assembly adapted to be coupled to the support structure, the mounting assembly including a tube configured to extend vertically, an arm assembly including a first arm coupled to the tube and extending therefrom, a portion of the arm assembly being adapted to be coupled to the service column so that the service column is supportable at a location spaced from the mounting assembly, and a leveling mechanism including a first member engaging the tube, a second member coupled to the first arm, and an adjuster coupled to the first and second members, the adjuster being movable to move the first member relative to the second member to move the first arm relative to the tube, wherein the first member is formed to include a threaded aperture, the second member is formed to include a journal aperture aligned with the threaded aperture, and the adjuster is a bolt having a first portion received in the threaded aperture and a second portion received in the journal aperture, the first arm being pivotable about a vertical pivot axis and the threaded aperture and the journal aperture define an axis that is substantially horizontal.

\* \* \* \* \*